United States Patent [19]

Yamada et al.

[11] Patent Number: 6,156,824
[45] Date of Patent: Dec. 5, 2000

[54] LUBRICATIVE POLYMER CONTAINING LIQUID AND METHOD OF FORMING FILM OF LUBRICATIVE POLYMER

[75] Inventors: Toshiro Yamada; Kuniaki Goto; Noriyasu Ohtsuki, all of Tokyo, Japan

[73] Assignee: Nippon Zeon Co., Ltd., Tokyo, Japan

[21] Appl. No.: 09/155,048

[22] PCT Filed: Mar. 21, 1997

[86] PCT No.: PCT/JP97/00946

§ 371 Date: Sep. 21, 1998

§ 102(e) Date: Sep. 21, 1998

[87] PCT Pub. No.: WO97/35919

PCT Pub. Date: Oct. 2, 1997

[30] Foreign Application Priority Data

Mar. 22, 1996 [JP] Japan .................................. 8-093464
Aug. 30, 1996 [JP] Japan .................................. 8-248581
Oct. 25, 1996 [JP] Japan .................................. 8-301061

[51] Int. Cl.[7] .............................. C08K 5/02; C08L 27/12; B05D 5/08
[52] U.S. Cl. .......................... 523/462; 524/544; 524/795; 523/149; 427/127; 427/385.5; 528/498
[58] Field of Search ..................... 524/462, 543, 524/544, 795; 528/498; 427/385.5, 127

[56] References Cited

U.S. PATENT DOCUMENTS 4,787,991  11/1988  Morozumi et al. ..................... 252/12.4
5,365,255  11/1994  Inoue et al. .
5,462,586  10/1995  Sugiyama et al. .
5,510,406   4/1996  Matsuo et al. ........................... 524/462
5,608,002   3/1997  Kubo et al. ............................... 524/462

FOREIGN PATENT DOCUMENTS 58-136663   8/1983  Japan .
2-129254    5/1990  Japan .
3-158884    7/1991  Japan .
3-197952    8/1991  Japan .
5-342570   12/1993  Japan .
4-211959   11/1994  Japan .
7-182652    7/1995  Japan .
7-182653    7/1995  Japan .
7-126428   10/1995  Japan .

*Primary Examiner*—Tae Yoon
*Attorney, Agent, or Firm*—Armstrong, Westerman, Hattori, McLeland & Naughton

[57] ABSTRACT

There is provided a lubricating polymer-containing liquid which comprises a film-forming lubricating polymer, preferably a fluoropolymer, and a liquid medium predominantly comprised of cyclic hydrofluorocarbon wherein said lubricating polymer is dissolved or dispersed. A lubricative polymer film of good performance is formed by coating, for example, a magnetic recording hard disk, an ink jet recording head or a cleaning blade of an image-forming device with the lubricating polymer containing liquid, and then removing the liquid medium.

10 Claims, No Drawings

LUBRICATIVE POLYMER CONTAINING LIQUID AND METHOD OF FORMING FILM OF LUBRICATIVE POLYMER

TECHNICAL FIELD

This invention relates to a liquid containing a lubricating polymer uniformly dissolved or dispersed in the liquid, and a process forming a lubricative film having excellent lubricative property on a surface of a solid from the lubricating polymer-containing liquid.

BACKGROUND ART

To impart lubricative property, water repellency and the like on a surface of a solid, a process for forming a film having good lubricative property on the solid surface from a liquid having a lubricating polymer dissolved or dispersed therein is adopted.

For miniaturization and precision-enhancement of electronic instruments, mechanical devices and parts, it is required that sliding parts or surfaces thereof have a good lubricative property. Especially, for improving sliding property between a hard disk, a miniature disk, a magnetic tape such as a digital audio tape or a video tape, or other magnetic recording mediums, and a head for recording and reading, lubrication with high precision, durability and reliability is required. Thus, to secure, for example, durability and practical reliability of a hard disk, a protective layer such as a carbon layer and additionally a lubricative layer of fluoropolymer are formed on a hard disk. For improvement of performances and miniaturization of cameras, video cameras, business and office machines, medical instruments, vacuuming devices such as a vacuum pump, electronic parts, precision automobile parts, small size motors, ultrasonic motors and micro-machines, formation of a lubricative layer made of a fluoropolymer on sliding parts is widely adopted to attain lubrication with enhanced durability, high reliability and reduced staining property. For an ink-jet recording head, a water repellent film is formed on a surface of the nozzle to secure extrusion stability and directional property of a polar liquid flowing through the nozzle hole.

Many proposals have been made as for the process for forming a lubricative film or a water repellent film on a surface of a solid. For example, a process has been proposed wherein a polymer having an extremely low surface tension such as a fluoropolymer is dissolved in a suitable volatile solvent, various materials and parts are coated with the thus-obtained solution, and then, the solvent is vaporized to form a polymer film.

Another proposal using a solution of a fluoropolymer in a fluorine-containing solvent is known. As for the fluorine-containing solvent, there can be mentioned, for example, freon 113 (Japanese Unexamined Patent Publication (abbreviated to "JP-A") H5-342570) and perfluoro-n-heptane (JP-A H4-211959). However, freon 113 is now not on the market although it has been heretofore used, because of prohibition of production of ozone-depleting substances. Perfluorocarbons such as perfluoro-n-heptane have a poor dissolving power for various materials and cannot be used for the formation of a uniform fluoropolymer film.

A process for forming a film from a polymer dispersion is described in JP-A H3-158884 wherein finely divided particles of polyvinylidene fluoride, phenolic resin or Tosupearl are dispersed in a liquid medium selected from isopropyl alcohol, ethyl alcohol, freon 113 and water, and the thus-prepared dispersion is coated on an image-carrier and a contact surface of a member placed in contact with the carrier in an image-forming device, followed by drying the coating. It is described in JP-A H3-158884 that frictional force between the image-carrier and the contact member such as a cleaning blade is mitigated by formation of the polymer film whereby problems such as surface peeling of the blade and non-uniform static electrification on the surface of the image-carrier are solved.

Another process for forming a film from a resin dispersion is described in JP-A H3-197952 wherein a dispersion of a finely divided lubricative powder such as finely divided fluoro-resin powder or a finely divided silicone resin powder in an organic solvent is sprayed onto a surface of an electrophotographic photoreceptor, followed by drying. As examples of the organic solvent, there can be mentioned freon solvents. It is described in this patent that frictional force between the photoreceptor and a cleaning blade for removing a residual toner is reduced by this process and thus a problem of surface peeling of the blade is solved.

However, the dispersions of the finely divided lubricative polymer particles in an organic solvent have a poor uniformity in dispersibility, and thus, the lubricative polymer films formed therefrom have an unsatisfactory effect for frictional force reduction.

DISCLOSURE OF THE INVENTION

By the above-mentioned proposed processes for forming a film of a lubricating polymer, the lubricating property of a solid surface can be improved to a certain extent. But, a process for forming a film of a lubricating polymer capable of reducing the frictional force of a solid surface to a greater extent is desired.

Therefore, the object of the present invention is to provide a process for forming a film of a lubricating polymer capable of reducing frictional force of a solid surface to a large extent.

The inventors treated solid surfaces with solutions and dispersions of fluoropolymers and other lubricating polymers in various organic solvents, and found that the above-mentioned object is achieved by using alicyclic hydrofluorocarbons as the organic solvent. Based on this finding, the present invention has been completed.

Thus, in accordance with the present invention, there is provided a lubricating polymer-containing liquid comprising a lubricating polymer capable of forming a film, and a liquid medium predominantly comprised of an alicyclic hydrofluorocarbon, in which the lubricating polymer is dissolved or dispersed.

In accordance with the present invention, there is further provided a process for forming a film of a lubricating polymer on a surface of a solid, characterized in that a surface of a solid is coated with the above-mentioned lubricating polymer-containing liquid, and then, the liquid medium is removed therefrom.

BEST MODE FOR CARRYING OUT THE INVENTION

Lubricating Polymer

The material of the lubricating polymer capable of forming a film used in the invention is not particularly limited provided that it is capable of forming a film exhibiting a good lubricative property on a solid surface. By the term "film" used herein we mean films in a broad sense which include not only a film with a completely uniform continuous phase which is formed from a solution of a lubricating polymer, but also a film in which finely divided particles of a lubricating polymer are not completely uniformed, when microscopically viewed. As examples of the lubricating polymer capable of forming a film, there can be mentioned fluoropolymers, silicone resins, phenolic resins and polyolefin resins. Of these, fluoropolymers are preferable.

The fluoropolymers are not particularly limited provided that the polymer has a fluorine atom in the molecule. As examples of the fluoropolymers, there can be mentioned fluoroolefin polymers and chlorofluoropolymers. More specifically, preferable examples of the fluoropolymers, there can be mentioned polytetrafluoroethylene (PTFE), a tetrafluoroethylene/perfluoroalkyl-vinyl-ether copolymer (PFA), a tetrafluoroethylene/hexafluoropropylene copolymer (FEP), a tetrafluoroethylene/hexafluoropropylene/ perfluoroalkyl-vinyl-ether copolymer (EPE), a tetrafluoroethylene/ethylene copolymer (ETFE), polychlorotrifluoroethylene (PCTFE), a chlorotrifluoroethylene/ ethylene copolymer (ECTFE), polyvinylidene fluoride (PVDF) and polyvinylfluoride (PVF). Of these, polytetrafluoroethylene and tetrafluoroethylene copolymers are especially preferable.

Fluoropolymers having a hetero atom are also preferably used in the present invention. The hetero atom includes atoms falling in the second period to the fourth period and in group 5B or group 6B of the periodic table. As specific examples of the hetero atom, there can be mentioned a nitrogen atom, an oxygen atom, a sulfur atom and a phosphorus atom. As specific examples of the hetero atom-containing fluoropolymers, there can be mentioned perfluoroalkylsulfonic acid polyesters, perfluoroalkyl polyethers, perfluoroalkyl group-containing polyimides, and partially fluorinated modified silicone oils. Of these, perfluoroalkyl polyethers are preferable.

Perfluoroalkyl polyethers used are not particularly limited provided that they are ordinarily used as a water-repellent film-forming material. For example, perfluoropolyethers which are described in JP-A S61-126627, JP-A S63-97264, JP-A H4-211959, JP-A H5-342570 and JP-A H7-182652 can be mentioned. As specific examples of the preferable perfluoropolyethers, there can be mentioned those which are represented by the formulae: $CH_3O$—$(CF_2CF_2O)_n$—$CH_3$, $PhOCH_2O$—$CH_2O$—$(CF_2CF_2O)_n$—$CH_3$ (wherein Ph is phenyl), $CF_3$—$[(OCF(CF_3)$—$CF_2)_n$—$(OCF_2)_m]$—$OCF_3$ and $CF_3$—$[(OCF_2CF_2)_n$—$(OCF_2)_m]$—$OCF_3$.

Fluoropolymers having a cyclic structure in the backbone chain, for example, polymers of a cyclic perfluorocarbon, cyclic perfluoroether, or a cyclic perfluorocarbon, a part of the fluorine atoms in which has been substituted by chlorine atoms, i.e., which is a cyclic fluorochlorocarbon, which are recited in JP-A H6-305151, can also be used. As examples of the fluoropolymers having a cyclic structure in the backbone chain, there can be mentioned polymers having recurring structural units represented by the following general formulae I to III.

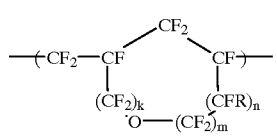

I wherein k=0–5, m=0–4, n=0–1, k+m+n=1–6 and R=F or $CF_3$,

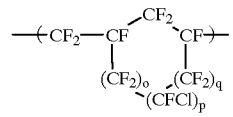

II wherein each of o, p and q=0–5 and o+p+q=1–6, and

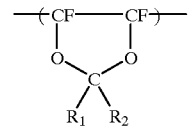

III wherein $R_1$=F or $CF_3$, and $R_2$=F or $CF_3$.

As specific examples of the recurring structural units represented by the general formulae I to III, there can be mentioned recurring structural units represented by the following formulae IV to X.

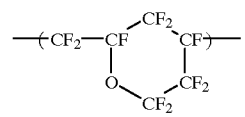

IV

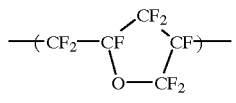

V

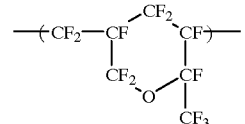

VI

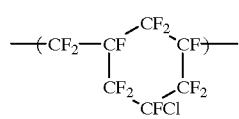

VII

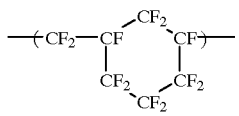

VIII

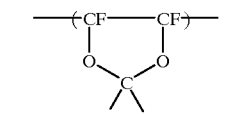

IX

The above-mentioned cyclic perfluorocarbons and cyclic perfluoroethers can be copolymerized with other monomers. As specific examples of the monomers copolymerized, there can be mentioned $CF_2$=CF—O—$CF_2CF(CF_2)$—O— $CF_2CF_2SO_2F$, $CF_2$=CF—O—$CF_2CF_2CF_2COOCH_3$, $CF_2$=CF—$CF_2$, $CF(CF_2)$—O— $CF_2CF_2SO_2F$ and $CONH(CH_2)_2Si(OC_2H_5)_2$.

The fluoropolymers recited in JP-A S64-31642 can also be used, which include the following (1) to (9) polymers.

(1) Copolymers of $C_8F_{17}SO_2N(C_3H_{17})CH_2CH_2OCOC(CH_3)$=$CH_2$ with an alkyl methacrylate not containing fluorine.

(2) Copolymers of $C_nF_{2n+1}CH_2CH_2OCOCH=CH_2$ (n=1–16) or $C_nF_{2n+1}CH_2OCOCH=CH_2$ (n=1–4) or $C_nF_{2n+1}OCOCH=CH_2$ (n=2–8) with a methyl methacrylate macromer, wherein the copolymerization ratio is in the range of 2:1 to 4:1 by mole.

(3) Polyurethane made from 2 moles of $C_{10}F_{21}CH_2CH_2OH$, 1 mole of PPG-5000 and 2 moles of tolylenediisocyanate.

(4) Polyester made from 1 mole of $C_8F_{17}SO_2N(CHCHOH)_2$, 3 moles of polyethylene glycol and 4 moles of adipic acid.

(5) Copolymer of 5 moles of $CF_2=CFCl$, 5 moles of $CH_2=CH-OC_2H_5$ and 1 mole of $CH_2=CH-O(CH_2)_2OH$.

(6) Copolymer of 1 mole of $CF_2=CFCl$ and 1 mole of $CH_2=CH_2$. (7) Copolymer of 1 mole of $CF_2=CFCF$ and 1 mole of $CH_2=CHOCH_3$.

(8) Polyurethane made from 1 mole of $HOCH_2CF_2O-(CF_2CF_2O)_{18}(CF_2O)_{23}CF_2CF_2OH$, 2 moles of stearyl alcohol and 2 moles of tolylenediisocyanate.

(9) Unsaturated polyester made from 10 moles of $(CF_3)_2-C(C_6H_4OH)_2$ or bisphenol A in which at least one H in the phenyl nucleus has been substituted by F, and 9 moles of adipic acid and 1 mole of fumaric acid.

The average molecular weight (number average molecular weight) of the fluoropolymer is not particularly limited, and varies depending on the kind of the fluoropolymer. The molecular weight is usually chosen within the range of 1,000 to 5,000,000, preferably 1,000 to 1,000,000 and more preferably 1,000 to 500,000. For example, in the case of perfluoroalkylpolyethers, the molecular weight is usually chosen within the range of 1,000 to 100,000, preferably 1,000 to 50,000 and more preferably 1,000 to 20,000 to obtain a polymer having highly balanced lubricative property, durability and film-forming property. The above-recited fluoropolymers (1) to (8) described in JP-A S64-31642 preferably have the following molecular weights: (1) 2,000 to 20,000, (2) 2,000 to 40,000, (3) about 5,900, (4) about 4,700, (5) about 3,000, (6) about 5,000, (7) about 8,000 and (8) about 15,000.

The liquid medium predominantly comprised of an alicyclic hydrofluorocarbon used in the present invention also has a good power of dispersing the lubricating polymer particles therein. Thus, the lubricating polymer can be dispersed in the form of finely divided particles in the liquid medium. More specifically, when the finely divided lubricating polymer particles are dispersed in the liquid medium, and a solid surface is coated with the thus-obtained liquid dispersion to form a film adhered onto the solid surface, the resulting lubricating polymer film is composed of highly uniformly distributed secondary particles having a narrow particle diameter distribution and has a small friction coefficient. The particle diameter of the finely divided fluoropolymer particles is suitably selected depending upon the intended use of the lubricative film, but is usually in the range of 0.01 to 50 µm, preferably 0.01 to 10 µm and more preferably in the range of 0.1 to 5 µm.

The lubricating polymer also can be dissolved in the liquid medium predominantly comprised of an alicyclic hydrofluorocaron and a solid surface is coated with the thus-obtained polymer solution to form a film. The form of the lubricating polymer used for dissolution in the liquid medium is not particularly limited, and can be any of particle form, grease form and wax form.

These lubricating polymers capable of forming a film can be used either alone or as a combination of at least two thereof.

Formulating Ingredients

If desired, in order to further reduce the friction coefficient while the good lubricating property of the lubricating polymer is maintained, formulating ingredients such as lubricants can be used in combination with the above-mentioned lubricating polymer, as described in JP-A H7-182652 and JP-A H7-182653.

As specific examples of the lubricants, there can be mentioned mineral oils such as paraffinic, aromatic and naphthenic oils, higher alcohols such as lauryl alcohol, tridecyl alcohol, cetyl alcohol, stearyl alcohol, oleyl alcohol, eicosyl alcohol and ceryl alcohol, higher fatty acids such as tridecanoic acid, myristyl acid, pentadecanoic acid, palmitic acid, margaric acid, stearic acid, nonadecanoic acid and arachic acid, and salts thereof with a metal such as Li, Na, K, Mg, Ca or Ba, higher fatty acid esters such as methyl myristylate, ethyl myristylate, isopropyl pentadecanoate, methyl palmitate, hexyl palmitate, butyl margarate, methyl stearate, ethyl stearate, propyl stearate, isopropyl stearate, butyl stearate, amyl stearate, isoamyl stearate and hexyl stearate, and fluorine-containing silane compounds such as $F_3C(CH_2)_2Si(CH_3)Cl_2$, $F_3C(CH_2)_2Si-(OCH_3)_3$, $F_3C(CF_2)_5(CH_2)_2SiCl_3$, $F_3C(CF_2)_7(CH_2)_2Si(CH_3)_2Cl$, $F_3C(CF_2)_7(CH_2)_2Si(OCH_2CH_3)_3$ and $F_3C(CF_2)_5(CH_2)_2Si(NH_2)_3$, as recited in JP-A H7-125219. Of these, mineral oils, silicone oils, higher alcohols, higher fatty acids, higher fatty acid salts and higher fatty acid esters are preferable.

The amount of the lubricant is suitably chosen within a range such that characteristics of the lubricating polymer are not damaged, and is usually in the range of 0.01 to 50 parts by weight, preferably 0.1 to 30 parts by weight and more preferably 1 to 15 parts by weight, based on 100 parts by weight of the lubricating polymer.

Alicyclic Hydrofluorocarbon Liquid Medium

The alicyclic hydrofluorocarbon used as a liquid medium is a hydrofluorocarbon having a cyclic molecular structure. The carbon number of the alicyclic hydrofluorocarbon is not particularly limited, but is usually in the range of 4 to 8, preferably 4 to 6 and more preferably 5. As for the number of fluorine atoms, when a fluoropolymer is used as a lubricating polymer, the more the number of fluorine atoms, the more preferable the liquid medium. For example, alicyclic hydrofluorocarbons having more fluorine atoms than hydrogen atoms are preferably used.

As specific examples of the alicyclic hydrofluorocarbon, there can be mentioned fluorocyclobutane, difluorocyclobutane, hexafluorocyclobutane, fluorocyclopentane, difluorocyclopentane, trifluorocyclopentane, hexafluorocyclopentane, heptafluorocyclopentane, octafluorocyclopentane, nonafluorocyclopentane, fluorocyclohexane, decafluorocyclohexane, tetradecafluorocyclooctane and pentadecafluorocyclooctane. Of these, hexafluorocyclobutane, hexafluorocyclopentane, heptafluorocyclopentane, octafluorocyclopentane, nonafluorocyclopentane and decafluorocyclohexane are preferable. Hexafluorocyclopentane, heptafluorocyclopentane, octafluorocyclopentane and nonafluorocyclopentane are especially preferable. These alicyclic hydrofluorocarbons can be used either alone or as a combination of at least two thereof.

The boiling point of the alicyclic fluorohydrocarbon is not particularly limited, but is usually in the range of 10 to 150° C., preferably 30 to 120° C. and more preferably 50 to 100° C. in view of the balance between coatability and drying property.

Other organic liquid mediums can be used in combination with the alicyclic hydrofluorocarbon according to the need in the present invention. The organic liquid medium used in combination with the alicyclic hydrofluorocarbon is not particularly limited provided that the organic liquid medium is usually used as a general purpose liquid medium for a lubricant, and includes, for example, other fluorine-containing liquid mediums, hydrocarbon liquid mediums, chlorohydrocarbon liquid mediums and alcohol liquid mediums. Of these, organic liquid mediums having a low boiling point, especially other fluorine-containing liquid mediums are preferable in view of ease of drying of the coated polymer solution or dispersion. As specific examples of the fluorine-containing liquid mediums, there can be mentioned chain fluorohydrocarbons having 1 to 6 carbon atoms such as $CH_2F_2$, $CH_3CHF_2$, $CHF_2CH_2F$ and $CF_3CHFCHFCF_2CF_3$; chain perfluorocarbons having 1 to 10 carbon atoms such as $CF_4$, $CF_3CF_3$, $CF_3CF_2CF_3$ and $(CF_3)_2CF_2$, alicyclic perfluorocarbons having 3 to 10 carbon atoms such as perfluorocyclobutene, perfluorocyclopentene and perfluorocyclohexene, fluorine-containing ethers such as $C_4H_9OCH_3$ and $C_4H_9OC_2H_5$ and hydrofluorocarbons such as $C_5H_2F_{10}$. Of these, cyclic perfluorocarbons, fluorine-containing ethers and hydrofluorocarbons are especially preferable in view of maintenance of dissolving power. Perfluorocyclopentene is most preferable.

These organic liquid mediums used in combination with the alicyclic hydrofluorocarbon can be used either alone or as a combination of at least two thereof. The amount of the organic liquid medium is not particularly limited provided that the object of the present invention can be achieved, and is usually not larger than 30% by weight, preferably not larger than 20% by weight and more preferably not larger than 10% by weight, based on the total weight of the liquid mediums.

Solid to Be Coated

The solid to be coated with the liquid containing the lubricating polymer of the present invention is not particularly limited, and is suitably chosen depending upon the intended use thereof. As specific examples of the material of the solid, there can be mentioned rubbers such as natural rubber, isoprene polymer, butadiene rubber (BR), styrene/butadiene rubber (SBR), hydrogenated styrene/butadiene rubber (hydrogenated SBR), acrylonitrile/butadiene rubber (NBR), hydrogenated acrylonitrile/butadiene rubber (hydrogenated NBR), chloroprene rubber (CR) and silicone rubber, metals such as aluminum, iron, stainless steel, titanium and copper; inorganic materials such as carbon, glass, ceramics and silicone, and resins such as polycarbonate, polyimide, polysulfone, polyester, polyethersulfone polyester, polyphenylene sulfide, polyurethane, polyolefin, bakelite and polyacetal photosensitive resin.

The lubricating polymer-containing liquid of the present invention is useful for coating a substrate of a magnetic recording medium with the polymer liquid.

As the substrate of a magnetic recording medium, those which are made by laminating a non-magnetic substrate or a primer-coated non-magnetic substrate, e.g., nickel/phosphorus-, titanium-, silicon- or alumite-coated non-magnetic substrates, with a film or films of ferromagnetic metal.

The ferromagnetic metal used includes, for example, Co, Co—Ni, Co—Cr, Co—Fe, Co—Ni—Cr, Co—Ni—Fe, Co—Ni—P and Co—Ni—Ta, and partially oxidized products thereof. Films of these ferromagnetic metals can be formed by any method of vacuum deposition, sputtering, ion-plating, and plating. If desired, a primer layer made of Cr or Ti can be formed under the ferromagnetic metal film or films. The thickness of the ferromagnetic metal film or films, which include the primer layer, if any, is preferably in the range of 500 to 5,000 angstroms.

A protective layer can be formed on the outer surface of the ferromagnetic metal film or films according to the need, as adopted in conventional magnetic recording mediums. As examples of the protective layer, there can be mentioned protective films of a metal such as Cr, W or Ni; protective films of an inorganic material such as SiO, SiC, carbon, graphite and diamond-like carbon as described in JP-A H5-342570 and JP-A S61-126627; and protective layers of organic materials or composite materials such as straight chain saturated fatty acids having 8 to 28 carbon atoms and alkali metal salts thereof such as Li, Na and K salts and alkaline earth metal salts thereof such as Mg, Ca and Ba salts, as described in Japanese Examined Patent Publication (hereinafter abbreviated to "JP-B") S56-30609, silicone resins as described in JP-A S61-131231, epoxy resins, polyamide resins, products of plasma-induced polymerization and products of radiation-induced polymerization. These protective layers may be used either alone or as a combination of at least two superposed layers. The thickness of the protective layer is suitably chosen depending upon the particular use, but is usually in the range of 0.001 to 0.1 $\mu$m, preferably 0.005 to 0.05 $\mu$m.

As specific examples of the solid which is composed of the above-mentioned material and coated with the lubricating polymer-containing liquid, there can be mentioned an ink-jet recording head; a cleaning blade of an office machine such as a rubber cleaning blade for removing residual toner on a photoreceptor of an electrophotographic copying machine; sliding parts of a camera, business and office machines, precision instruments, vacuuming devices such as a vacuum pump, electronic parts, precision automobile parts, small size motors, ultrasonic motors and micro-machines; magnetic recording mediums such as a hard disk; and an insert placed between a film and a rubber or a resin sheet.

Lubricating Polymer-Containing Liquid

To dissolve or disperse the above-mentioned lubricating polymer or a combination of the polymer with formulating ingredients in a liquid medium predominantly comprised of a cyclic fluorohydrocarbon, the lubricating polymer is placed in the liquid medium and the mixture is stirred. According to the need, heating or ultrasonic irradiation can be adopted.

The content of the lubricating polymer in the lubricating polymer-containing liquid of the present invention is suitably chosen depending upon the kind of lubricating polymer, the solid to be coated with the polymer-containing liquid, the working properties for coating and the coating thickness, and is usually in the range of 0.0001 to 50% by weight, preferably 0.001 to 10% by weight and more preferably 0.005 to 5% by weight, based on the weight of the polymer-containing liquid (i.e., the total weight of the liquid medium and the lubricating polymer). For example, in the case where a hard disk is coated with the polymer-containing liquid, the content of the polymer in the liquid is preferably low, i.e., in the range of about 0.01 to 1% by weight. A suitable content varies depending upon the particular type of the liquid, namely, as to whether the lubricating polymer is dissolved or dispersed in the liquid medium. When the lubricating polymer is dissolved in the liquid medium, the content of polymer is usually in the range of 0.0001 to 10% by weight, preferably 0.001 to 1% by weight and more preferably 0.005 to 0.5% by weight based on the total weight of the polymer and the liquid medium. When the lubricating polymer is dispersed in the liquid medium, the content of polymer is usually in the range of 0.01 to 20% by weight, preferably 0.1 to 10% by weight and more preferably 0.5 to 5% by weight based on the total weight of the polymer and the liquid medium.

Treatment of Solid Surface

A film of the lubricating polymer can be formed by a process wherein a surface of a solid is coated with a liquid containing the lubricating polymer in a liquid medium, and then the liquid medium is removed from the coated liquid.

The coating of the solid surface with the solution or dispersion containing a lubricating polymer such as a fluoropolymer can be conducted by the ordinary method. For example, dipping, spin-coating or spraying can be adopted. The liquid medium contained in the coating is removed by drying the coating in an atmosphere of inert gas such as nitrogen gas at room temperature or an elevated temperature. The heat drying can also be conducted in vacuo, i.e., at a pressure of not higher than $10^{-1}$ Torr. Irradiation with electron rays or light can be employed for promoting the removal of the liquid medium.

If desired, heat, light or electron rays can be applied to the coating film after it is dried, to enhance the polymerization degree of the lubricating polymer such as a fluoropolymer constituting the coating film, or form a crosslinking.

The thickness of the dried coating film of the lubricating polymer is usually in the range of 0.0001 to 10 μm, preferably 0.0005 to 5 μm and more preferably 0.001 to 3 μm. A suitable film thickness varies depending upon the particular use thereof. For example, the film formed on an ink-jet recording head usually has a thickness of 0.001 to 10 μm, preferably 0.005 to 5 μm and more preferably 0.01 to 2 μm; the film formed on a cleaning blade of an electrophotographic copying machine usually has a thickness of 0.01 to 10 μm, preferably 0.01 to 5 μm and more preferably 0.1 to 5 μm; and the film formed on a magnetic recording hard disk usually has a thickness of 0.0001 to 10 μm, preferably 0.0001 to 5 μm and more preferably 0.0005 to 3 μm.

The lubricating polymer-containing liquid of the invention and the process of the invention for forming a lubricative film or a water repellent film will now be specifically described by the following examples and comparative examples. In these examples, parts and % are by weight unless otherwise specified.

Characteristics of fluoropolymer films formed by surface-treating a solid to be coated were evaluated as follows.

(1) Thickness of film

After the coating film of a fluoropolymer formed on a solid to be coated is thoroughly dried, the thickness of the film was measured at five points optionally chosen on the film by using an ellipsometer.

(2) Dispersibility of finely divided lubricating polymer particles

After the coating film of a fluoropolymer formed on a solid to be coated is thoroughly dried, the surface of the dried film was observed by a scanning electron microscope to evaluate the dispersion state of secondary particles of the finely divided particles and the distribution of particle diameters of the secondary particles.

(3) Friction coefficient

After the coating film of a fluoropolymer formed on a solid to be coated is thoroughly dried, the static friction coefficient was measured at optionally chosen five points on the film at room temperature and a sliding speed of 1.5 mm/sec by using a pin-disc friction tester.

(4) Deposition of ink

An ink was ejected from a tip of glass capillary tube, and immediately thereafter, the undesirable deposition of the ink on the tip portion of the capillary was examined without drying the tip portion. Namely, the tip portion was observed from a direction perpendicular to the tip surface of the capillary by a microscope at 100x magnification. The undesirable deposition of ink was found usually in the periphery of the ejection opening of the capillary.

The results of examination were evaluated according to the following four ratings.

A: No deposition was observed.

B: A very slight amount of deposition was observed.

C: A small amount of deposition was observed (the area of ink deposition is in the range of 10 to 20% of the entire area of tip portion of the capillary).

D: A considerable amount of deposition was clearly observed.

(5) Uniformity of ink ejection

A piezoelectric voltage was imposed to a capillary filled with an ink to eject the ink. The uniformity of ink ejection was visually examined.

EXAMPLE 1

Fomblin Z25 (perfluoroalkylpolyether polymer having a number average molecular weight of 9,500; supplied by Ausimont S.p.A.) was dissolved in 1,1,2,2,3,3,4,5-octafluorocyclopentane to prepare a fluoropolymer-containing liquid for coating having a 0.05% concentration. A slide glass sheet was thoroughly washed and then dried. The slide glass sheet was dipped in the fluoropolymer-containing liquid, and then slowly pulled up from the liquid and thoroughly dried in the air. The thickness of the thus-formed film was measured at five points optionally chosen on the film by using an ellipsometer. The measurement showed that the film thickness was uniform as shown in Table 1. When droplets of water were placed on the film, the entire surface of the film exhibited good water repellency.

EXAMPLES 2 AND 3

Coating films of the fluoropolymer were formed by the same procedures as described in Example 1 except that the fluoropolymer liquid was coated on a stainless steel sheet (Example 2) and a polyester (PET) resin test piece (Example 3) instead of the glass sheet. The measurement of the film thickness at optionally chosen five points on the film surface showed that, as shown in Table 1, fluoropolymer films having uniform thickness could be obtained even when the films were formed on the stainless steel sheet or polyester piece.

TABLE 1

| | Film Thickness in Angstrom | | | | |
|---|---|---|---|---|---|
| Measurement points | 1 | 2 | 3 | 4 | 5 |
| Example 1 | 84 | 80 | 82 | 79 | 83 |
| Example 2 | 70 | 72 | 68 | 71 | 72 |
| Example 3 | 85 | 87 | 82 | 85 | 81 |

EXAMPLE 4

Fomblin Z25 containing 2% of a mineral oil (Diana process oil PW-90; supplied by Idemitsu Kosan Co.) was dissolved or minutely dispersed by ultrasonic irradiation, and 1,1,2,2,3,3,4,5-octafluorocyclopentane was incorporated therein to prepare a coating liquid containing 0.05% of Fomblin Z25. Using this fluoropolymer-containing liquid, a coating film of fluoropolymer was formed on a glass sheet by the same procedures as described in Example 1. The static friction coefficient was measured at five points optionally chosen on the film by using a pin-disc friction tester at room temperature and a sliding speed of 1.5 mm/sec. The results are shown in Table 2.

Comparative Example 1

By the same procedures as described in Example 4, a coating film was formed and its static friction coefficient was measured, wherein perfluoro-n-heptane was used as the liquid medium with other conditions remaining the same. The results are shown in Table 2.

TABLE 2

| | Static friction coefficient | | | | |
|---|---|---|---|---|---|
| Measurement points | 1 | 2 | 3 | 4 | 5 |
| Example 4 | 0.6 | 0.6 | 0.6 | 0.6 | 0.6 |
| Comp. Example 1 | 0.8 | 1.2 | 0.7 | 0.6 | 0.9 |

As seen from Table 2, the film formed in the example of the invention (Example 4) had a small and uniform static friction coefficient. In contrast, the film formed in Comparative Example 1 using a chain liquid medium had a large and non-uniform static friction coefficient.

EXAMPLE 5

Comparative Example 2

A fluoropolymer was incorporated with another lubricant, and the solubility of the mixture in the liquid medium used in the present invention or another liquid medium was tested. Namely, 100 parts of Fomblin Z03 (perfluoroalkylpolyether polymer having a number average molecular weight of 4,000; supplied by Ausimont S.p.A.) was incorporated with 10 parts of the lubricant shown in Table 3, and the lubricant was dissolved in the fluoropolymer or the mixture was irradiated with ultrasonic wave to minutely disperse the lubricant in the fluoropolymer. Then 1,1,2,2,3,3,4,5-octafluorocyclopentane or perfluoro-n-heptane as a liquid medium was added and stirred at room temperature to prepare a coating liquid containing 0.1% of Fomblin Z03. The solubility of Fomblin Z03 in the liquid medium was evaluated by the visual examination according to the following ratings. The results are shown in Table 4.

A: The polymer was uniformly dissolved.
B: The liquid became turbid to slight extent.
C: The polymer was not dissolved at all.

TABLE 3

| | Solubity | |
|---|---|---|
| Lubricant | Ex. 5 | C. E. 2 |
| Mineral oil (Diana process PW-90) | A | C |
| Isoamyl stearate | A | C |
| Palmitic acid | B | C |
| Oleyl alcohol | A | C |
| Silicone oil | A | B |

As seen from Table 3, in the example of the invention (Example 5) wherein 1,1,2,2,3,3,4,5-octafluorocyclopentane was used as a liquid medium, even when another lubricant is uniformly dissolved. In contrast, in the case where perfluoro-n-heptane is used as a liquid medium (Comparative Example 2), when another lubricant is added to the fluoropolymer, the polymer becomes difficult to dissolve in the liquid medium.

EXAMPLE 6

Comparative Example 3

Finely divided polytetrafluoroethylene particles having an average particle diameter of 0.5 $\mu$m were dispersed in 1,1,2,2,3,3,4,5-octafluorocyclopentane (boiling point: 79.4° C.) to prepare a liquid dispersion having a solid content of 1.0%. A hydrogenated nitrile rubber (hydrogenated acrylonitrile-butadiene rubber; supplied by Nippon Zeon Co.) sheet was coated with the liquid dispersion by a spraying method, and the liquid medium was volatilized to be thereby removed from the thus-obtained coating film at room temperature. The coating film was further dried by blowing warm air at 60° C. whereby a rubber sheet was obtained which has finely divided fluoropolymer particles dispersed in a film form on the rubber sheet. The characteristics of the coating film of the finely divided fluoropolymer particles were evaluated. The results are shown in Table 4.

For comparison, finely divided fluoropolymer particles were dispersed in a film form on a rubber sheet by the same procedures as described above except that perfluoro-n-heptane was used instead of 1,1,2,2,3,3,4,5-octafluorocyclopentane as the dispersing medium. The characteristics of the film of the finely divided fluoropolymer particles are shown in Table 4.

TABLE 4

| | Example 6 | Comp. Ex. 3 |
|---|---|---|
| Average film thickness ($\mu$m) | 1.8 | 8.7 |
| Dispersibility | | |
| Dispersibility of secondary particles | Uniform | Nonuniform |
| Distribution range of diameter of secondary particles ($\mu$m) | About 1–3 | About 1–30 |
| Static friction coefficient | | |
| 1 | 0.5 | 0.9 |
| 2 | 0.4 | 1.1 |
| 3 | 0.5 | 0.8 |
| 4 | 0.5 | 1.1 |

TABLE 4-continued

|  | Example 6 | Comp. Ex. 3 |
| --- | --- | --- |
| 5 | 0.5 | 0.9 |
| Average | 0.48 | 0.96 |

As seen from Table 4, in the case where finely divided fluoropolymer particles are dispersed in a liquid medium composed of an alicyclic hydrofluorocarbon, and a solid surface is coated with the thus-prepared liquid dispersion whereby the finely divided particles are dispersed in a film form on the solid surface (Example 6), the dispersibility of secondary particles is better, the distribution range of particle diameter thereof is narrower and the friction coefficient is smaller than those in the case where a straight chain hydrofluorocarbon is used as a liquid medium (Comparative Example 3).

EXAMPLE 7

Fomblin Z25 (perfluoroalkylpolyether polymer having an average molecular weight of 9,500; Ausimont S.p.A.) was dissolved in 1,1,2,2,3,3,4,5-octafluorocyclopentane to prepare a coating liquid (A) containing 0.3% of the fluoropolymer. The tip portion of a capillary filled with water was dipped the fluoropolymer-containing liquid (A), and then slowly pulled up from the liquid and thoroughly dried in the air. The film was further dried under a warm air stream at 80° C. for 10 minutes to form a film of the fluoropolymer on the tip portion of the capillary.

The capillary used in this example was made as follows. A capillary tube having an inner diameter of 0.10 mm and an outer diameter of 0.35 mm was prepared from a commercially available glass tube, and the capillary tube was processed so that the ejection opening part thereof became flat. The tip end portion of the capillary tube was provided with a piezoelectric element so that, when a piezoelectric voltage is imposed to the tip portion, a pressure is applied from the periphery thereof to eject an ink.

The thickness of the fluoropolymer film formed on the tip portion of the capillary was measured, and the deposition of ink on the tip portion of the capillary was examined by a microscope. The results are shown in Tables 5 and 6, respectively. Visual observation of uniformity of the ink ejection revealed that the ink was not splashed, and satellite particles did not occur and thus the ejection of ink was completely uniform.

Comparative Example 4

By the same procedures as described in Example 7, a fluoropolymer film was formed except that perfluoro-n-heptane was used as the liquid medium. The thickness of the fluoropolymer film was measured and the deposition of ink was visually examined. The results are shown in Tables 5 and 6, respectively. Visual observation of uniformity of the ink ejection revealed that the ink was not splashed, but satellite particles occurred to a considerable extent.

EXAMPLE 8

To a macromonomer of a fluorine-containing methyl methacrylate, which has a vinyl group at one end of the molecule and an average molecular weight of about 3,600, 3% of a photo-radical curing agent was added. The resulting mixture was dissolved in 1,1,2,2,3,3,4,5-octafluorocyclopentane to prepare a coating liquid containing 0.5% of a fluoropolymer. The tip portion of a glass tube capillary was coated with the fluoropolymer-containing liquid by the same procedures as described in Example 7, and then dried. The fluoropolymer coating was irradiated with ultraviolet rays at a dose of 2.8 J/cm$^2$ to further polymerize and cure the fluoropolymer coating. The thickness of the cured coating film was measured and the deposition of ink on the tip portion of the capillary was examined. The results are shown in Tables 5 and 6, respectively. Visual observation of uniformity of the ink ejection revealed that satellite particles did not occur and thus the ejection of ink was completely uniform.

TABLE 5

| | Thickness of fluoropolymer film (angstrom) | | | | |
| --- | --- | --- | --- | --- | --- |
| | 1 | 2 | 3 | 4 | 5 |
| Example 7 | 395 | 390 | 401 | 407 | 411 |
| Comp. Example 4 | 358 | 427 | 396 | 380 | 412 |
| Example 8 | 500 | 491 | 502 | 510 | 526 |

TABLE 6

Ink deposition at tip of capillary

| | Ink deposition |
| --- | --- |
| Example 7 | A |
| Comp. Example 4 | C |
| Example 8 | A |

EXAMPLE 9

Demnum (perfluoroether-type lubricant having an average molecular weight of 5,600; supplied by Daikin Industries Ltd.) was dissolved in 1,1,2,2,3,3,4,5-octafluorocyclopentane to prepare a coating liquid containing 0.2% of a fluoropolymer. A hard disk substrate made of aluminum, the surface of which was electroplated with nickel, was provided with a cobalt alloy magnetic layer on the nickel plating. Further, a carbon layer with a thickness of about 200 angstrom was formed on the cobalt alloy magnetic layer. Five of the thus-prepared hard disk were vertically stood at a stated interval within a dipping vessel. The above-mentioned fluoropolymer-containing coating liquid maintained at 35° C. was slowly poured into the dipping vessel at a rate such that the entire surfaces of the hard disks were immersed within the bath of coating liquid when two minutes passed after the commencement of pouring. Then the hard disks were maintained in a stationary state for two minutes within the bath of coating liquid, and thereafter pulled up slowly over a period of two minutes, followed by drying.

The surface of the hard disk was observed by an atomic force microscope to examine the surface state of the fluoropolymer film. Further, the thickness of the fluoropolymer film was measured by the atomic force microscope at five points located on a straight line radially extending from the center of the disk surface. For determination of the zero thickness point in the measurement of thickness, a part of the fluoropolymer film was etched with a solvent to remove the part of polymer and expose the under carbon layer. The evaluation results are shown in Table 7. Wrinkles did not occur, and the fluoropolymer exhibited an enhanced uniformity in thickness.

EXAMPLE 10

The procedures employed in Example 9 were repeated wherein Fomblin (perfluoroether polymer having an average molecular weight of 9,500; supplied by Ausimont S.p.A.) with all other conditions remaining the same. The fluoropolymer film exhibited good properties which are similar to those of the film made in Example 7. The evaluation results are shown in Table 7.

EXAMPLE 11

A fluoropolymer film was formed on a surface of a hard disk by the same procedures as employed in Example 9. The friction coefficient of the film was measured by using a CSS (contact start-and-stop) tester at 15,000 CSS times. The results are shown in Table 8. Thus the fluoropolymer had a reduced friction coefficient and good durability.

EXAMPLE 12

A fluoropolymer film was formed on a surface of a hard disk by the same procedures as employed in Example 10. The friction coefficient of the film was measured by the same method as employed in Example 11 using a CSS tester. The results are shown in Table 8. Thus the fluoropolymer exhibited good properties similar to those in Example 11.

EXAMPLE 13

A fluoropolymer film was formed on a hard disk surface by the same procedures as employed in Example 10 wherein a mixture of 1,1,2,2,3,3,4,5-octafluorocyclopentane and 0.2% of aroma-type mineral oil was used as a liquid medium for the fluoropolymer. The surface state and thickness of the fluoropolymer film were evaluated by the same methods as employed in Example 9. The results are shown in Table 7.

Comparative Example 5

The procedures employed in Example 9 were repeated wherein perfluoro-n-pentane was used as a liquid medium instead of 1,1,2,2,3,3,4,5-octafluoropentane with all other conditions remaining the same. The results of evalauation of the fluoropolymer film are shown in Table 7. The thickness of the fluoropolymer film was not uniform.

Comparative Example 6

A fluoropolymer film was formed by the same procedures as employed in Comparative Example 5, and the CSS test was repeated by the same procedures as employed in Example 11. The test results are shown in Table 8. The friction coefficient of the film was larger than that in Example 11, and increased when the CSS time reached 12,000 times.

Comparative Example 7

The procedures employed in Example 10 were repeated wherein perfluoro-n-pentane was used as a liquid medium instead of 1,1,2,2,3,3,4,5-octafluoropentane with all other conditions remaining the same. When the fluoropolymer was dissolved in the liquid medium, the resulting solution was turbid. Cosequently, the fluoropolymer film formed on the hard disk surface exhibited a non-uniform thickness. The results of evaluation of the film are shown in Table 7.

Comparative Example 8

A fluoropolymer film was formed by the same procedures as employed in Comparative Example 7, and the CSS test was repeated by the same procedures as employed in Example 12. The test results are shown in Table 8. The friction coefficient of the film was larger than that in Example 11, and increased when the CSS time reached 1,000 times.

TABLE 7

| | Thickness (angstrom) | | | Presence of surface wrinkles |
|---|---|---|---|---|
| | Max | Min | Avg*1 | |
| Example 9 | 22 | 22 | 22 | Not observed |
| Example 10 | 27 | 26 | 26 | Not observed |
| Example 13 | 27 | 26 | 27 | Not observed |
| Comp. Example 5 | 25 | 21 | 22 | Wrinkles observed in circumferential direction |
| Comp. Example 7 | Many irregular and large undulations observed | | | Wrinkles markedly observed |

*1 Average thickness measured at five points

TABLE 8

| | Initial friction coefficient | CSS times at which friction coefficient increased |
|---|---|---|
| Example 11 | 0.42 | Initial value kept at constant until 15,000 times |
| Example 12 | 0.40 | Ibid |
| Comp. Example 6 | 0.65 | Increased at 12,000 times |
| Comp. Example 8 | Measured values greatly fluctuated in the range of about 1 to 3 | |

INDUSTRIAL APPLICABILITY

When a surface of a solid is coated with the lubricating polymer-containing liquid of the present invention, which is prepared by dissolving or dispersing a film-forming lubricating polymer in a liquid medium predominantly comprised of an alicyclic hydrofluorocarbon, to form a coating film of the lubricating polymer, a lubricative film or water-repellent film having a uniform thickness is obtained.

Therefore, the lubricating polymer-containing liquid of the present invention is useful for the formation of a water-repellent film on an ink jet recording head; and the formation of lubricative films on an ink jet recording head, a cleaning blade of a business or office machine, such as a cleaning rubber blade for removing a residual toner on a photoreceptor of an electrophotographic copying machine; sliding parts of a camera, a business or office machine, a medical instrument, a precision instrument, a vacuuming device such as a vacuum pump, an electronic part, a small size motor, an ultrasonic motor and a micro-machine; and a magnetic recording medium such as a hard disk.

What is claimed is:

1. A lubricating polymer-containing liquid comprising a lubricating polymer capable of forming a film, and a liquid medium predominantly comprised of at least one alicyclic hydrofluorocarbon selected from the group consisting of hexafluorocyclopentane, heptafluorocyclopentane octafluorocyclopentane and nonafluorocyclopentane, in which the lubricating polymer is dissolved or dispersed.

2. The lubricating polymer-containing liquid according to claim 1, wherein the lubricating polymer is at least one polymer selected from the group consisting of fluoropolymers, silicone resins, phenol resins and polyolefin resins.

3. The lubricating polymer-containing liquid according to claim 1, wherein the lubricating polymer is a fluoropolymer.

4. The lubricating polymer-containing liquid according to claim 2, wherein the fluoropolymer is selected from the group consisting of fluoroolefin polymers, chlorofluoroolefin polymers, and fluoropolymers having as a hetero atom an atom falling in the second period to the fourth period and in group 5B or group 6B of the periodic table.

5. The lubricating polymer-containing liquid according to claim 1, which further comprises a lubricant.

6. The lubricating polymer-container liquid according to claim 5, wherein the lubricant is at least one selected from the group consisting of mineral oils, silicone oils, alcohols having at least 12 carbon atoms, fatty acids having at least 13 carbon atoms, salts of fatty acids having at least 13 carbon atoms and fatty acid esters having at least 14 carbon atoms.

7. The lubricating polymer-containing liquid according to claim 5, wherein the amount of the lubricant is 0.01 to 50 parts by weight based on 100 parts by weight of the lubricating polymer.

8. A process for forming a film of a lubricating polymer on a surface of a solid, characterized in that a surface of a solid is coated with the lubricating polymer-containing liquid as claimed in claim 1, and then the liquid medium is removed therefrom.

9. The process according to claim 8, wherein the solid is a head for ink jet recording, a cleaning blade of an image-forming apparatus, or a magnetic recording medium.

10. The process according to claim 9, wherein the magnetic recording medium is a hard disk.

* * * * *